UNITED STATES PATENT OFFICE.

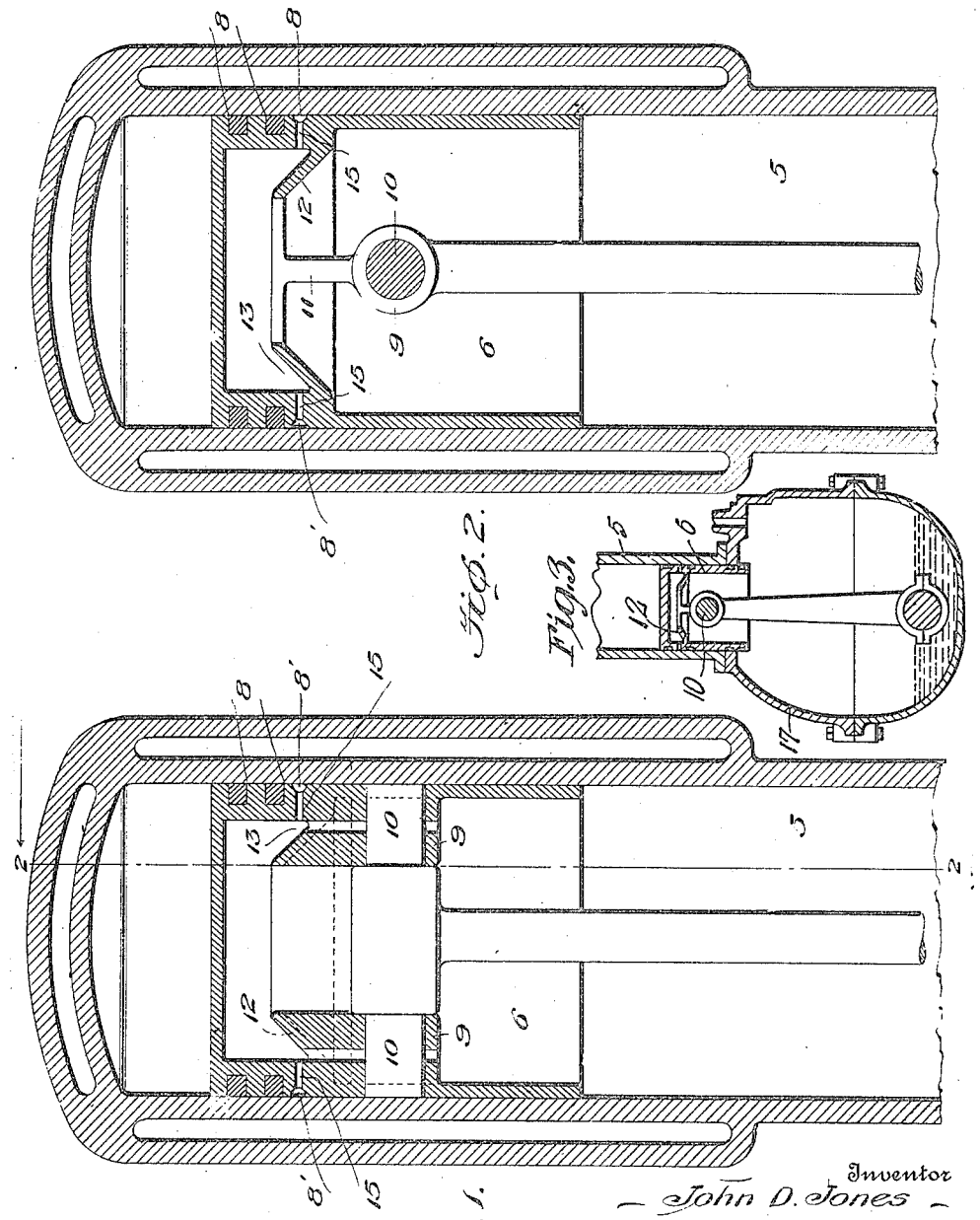

JOHN D. JONES, OF WALLA WALLA, WASHINGTON.

LUBRICATOR FOR ENGINES.

1,231,615.  Specification of Letters Patent.  Patented July 3, 1917.

Application filed January 8, 1917. Serial No. 141,239.

*To all whom it may concern:*

Be it known that I, JOHN D. JONES, a citizen of the United States, residing at Walla Walla, in the county of Walla Walla and State of Washington, have invented certain new and useful Improvements in Lubricators for Engines, of which the following is a specification.

This invention relates to improvements in explosion engines, one object of the invention being the provision of a novel arrangement for cooling the head of the piston with lubricating oil which is also applied to the outer ends of the cross-head pin and to the outer face of the piston and the inner surface of the cylinder from such cooling chamber.

A further object of this invention is the provision of a novel construction of piston in which an annular lubricant receiving chamber is provided adjacent the closed end thereof for cooling the hottest portion of the piston and at the same time supplying lubrication to the essential parts.

With the foregoing and other objects in view and which will appear as the description proceeds, the invention resides in the combination and arrangement of parts hereinafter set forth and particularly claimed.

In the accompanying drawings:

Figure 1 is a cross sectional view through an explosive engine cylinder showing the present form of piston in operable relation thereto.

Fig. 2 is a section taken on line 2—2 of Fig. 1.

Fig. 3 is a vertical sectional view through one cylinder and the crank case of an engine, embodying the present invention.

Referring to the drawings, the numeral 5 designates the cylinder of the engine and 6 the piston. The piston in this instance is provided with the packing ring grooves 8 of usual formation and below the lower groove is provided a circumferential lubricant conveying groove 8' of lesser width and depth than the packing ring groove.

The crank case 15 of the engine constitutes an oil reservoir in which dips the crank shaft 16 which has connected thereto the connecting rod 17 which in turn is connected to the piston through the cross-head pin 10.

Cast integral with the piston within the hollow portion thereof are the two oppositely disposed bosses or lugs 9 each one of which is bored to receive the cross-head pin 10, a web 11 projecting from the upper surface of the lug to and engaging the under surface at opposite points of the upwardly and inwardly projecting lip flange or apron 12 which provides an annular lubricant receiving and cooling chamber 13 for the closed end of the piston. The lubricant is adapted to be automatically placed in this chamber during the inward movement of the piston from the lubricant supplied to the crank case 17, and as this chamber is adjacent the hottest end of the piston the lubricant acts as a cooling means as well as a lubricator.

A lubricant conducting opening 14 is bored through the web to form a communication with the bore of the cross-head pin receiving boss and the lubricant chamber so that the ends of the cross-head pin are properly lubricated at all times while leading from the lubricant receiving and cooling chamber are the radiating bores or openings 15 which lead to and terminate in the groove 8.

As shown in Fig. 3 it is evident that when the crank shaft during the rotation thereof enters the oil within the crank case that the same is splashed so as to in turn enter the piston and after contacting the upper end of the connecting rod and the closed end of the piston is directed into the flange or apron 12, thus cooling the upper end of the piston and at the same time supplying lubricant to the exterior of the piston and through the openings 14 to the ends of the cross head pin.

From the foregoing description it is evident that with this arrangement in the piston head the lubricant which is supplied in the chamber at the head keeps the hottest portion of the piston cool or at a lower temperature than it ordinarily would be without this formation while the lubricant accumulated thereat is supplied to the outer surface of the piston to lubricate the walls of the cylinder and to the ends of the cross-head pin to lubricate such points.

What I claim as new is:

1. A piston having internal oppositely disposed cross-head pin receiving bosses and an annular cooling and lubricating fluid receiving chamber above said bosses, the piston being closed at its upper end and open at its lower end and substantially unobstructed except by the wrist-pin and said bosses, said chamber having bores leading therefrom to the bosses to conduct said fluid to the cross-head pin.

2. A piston having internal oppositely disposed cross-head pin receiving bosses and an annular cooling and lubricating fluid receiving chamber above said bosses, the piston being closed at its upper end and open at its lower end and substantially unobstructed except by the wrist-pin and said bosses, said chamber having bores leading therefrom to the bosses to conduct said fluid to the cross-head pin, said chamber being further provided with a plurality of bores leading to the outer face of the piston to direct the fluid as a lubricant to the periphery of the piston.

3. An explosion engine piston having a transverse bore for the reception of a cross-head pin, a flange between said bore and the closed head of the piston, two reinforcing webs for said flange, said webs having passages therethrough communicating with the chamber formed by the flange and with the bore.

In testimony whereof I affix my signature in the presence of two witnesses.

JOHN D. JONES.

Witnesses:
A. A. KING,
F. R. BIRKES.